United States Patent
Poque et al.

[11] Patent Number: 5,964,267
[45] Date of Patent: Oct. 12, 1999

[54] TREAD CONFIGURATION

[75] Inventors: Dionysius Josef Poque; Johannes Josef Baumhöfer, both of Aachen; Michael Jansen, Heiusberg; Hermann Stump, Eschweiler, all of Germany

[73] Assignee: Uniroyal Englebert Reifen GmbH, Aachen, Germany

[21] Appl. No.: 08/811,144

[22] Filed: Mar. 3, 1997

Related U.S. Application Data

[63] Continuation-in-part of application No. 08/435,407, May 10, 1995, abandoned.

[30] Foreign Application Priority Data

May 10, 1994 [DE] Germany ............... 44 16 435

[51] Int. Cl.$^6$ ............... B60C 11/11; B60C 11/13; B60C 101/00
[52] U.S. Cl. ............... 152/209.21; 152/209.24; 152/902
[58] Field of Search ............... 152/209 R, 209 B, 152/209 D, DIG. 3, 209.18, 209.21, 209.24, 902

[56] References Cited

U.S. PATENT DOCUMENTS

| | | | |
|---|---|---|---|
| 1,201,744 | 10/1916 | Kremer | 152/209 R |
| 4,299,264 | 11/1981 | Williams | 152/209 R |
| 4,702,292 | 10/1987 | Brayer | 152/209 R |
| 4,986,324 | 1/1991 | Suzuki et al. | 152/209 R |
| 5,027,875 | 7/1991 | Kogure | 152/209 R |
| 5,031,680 | 7/1991 | Kajikawa et al. | 152/209 R |
| 5,178,698 | 1/1993 | Shibata | 152/209 R |
| 5,386,861 | 2/1995 | Overhoff et al. | 152/DIG. 3 |
| 5,388,625 | 2/1995 | White | 152/209 R |
| 5,450,885 | 9/1995 | Hanya | 152/209 R |

FOREIGN PATENT DOCUMENTS

| | | | |
|---|---|---|---|
| 681930 | 11/1995 | European Pat. Off. . | |
| 1-204805 | 8/1989 | Japan | 152/209 R |
| 223006 | 9/1989 | Japan | 152/209 R |
| 267009 | 10/1990 | Japan | 152/209 D |
| 178808 | 8/1991 | Japan | 152/209 D |
| 246104 | 11/1991 | Japan | 152/209 R |
| 317805 | 11/1992 | Japan | 152/209 R |
| 6-171312 | 6/1994 | Japan | 152/209 R |

*Primary Examiner*—Steven D. Maki
*Attorney, Agent, or Firm*—Robert W. Becker & Associates

[57] ABSTRACT

A tread configuration for a vehicle tire, including at least two adjacent circumferentially oriented rows of profiled blocks. The rows are separated from one another by respective circumferential grooves. The base of each groove extends parallel to the circumferential direction. A respective side wall on each side of the base extends radially outwardly from the base and forms side walls of profiled blocks of an adjacent one of the rows of blocks. Radially outer end portions of the side walls of the grooves are essentially oriented in the circumferential direction and have their contour divided by a plurality of axially oriented offsets.

19 Claims, 6 Drawing Sheets

TREAD CONFIGURATION

This application is a continuation-in-part, of application Ser. No. 08/435,407 filed May 10, 1995 now abandoned.

BACKGROUND OF THE INVENTION

The present invention relates to a tread configuration for a vehicle tire, the tread configuration comprising adjacent circumferentially oriented, rows of profiled blocks that are separated from one another by respective circumferential grooves.

For a tire to be suitable for use under winter conditions, it is desirable to have a pronounced block structure and hence pronounced transverse edges to provide suitable traction in snow. In conformity therewith, special winter tires having particularly pronounced rows of blocks or lugs are known. On the other hand, with specialized summer tires it is desired to provide good traction for wet weather and thus an optimum discharge or withdrawal of water. For this purpose, grooves that extend in the circumferential direction are disposed between rows of profiled blocks. Such summer tires customarily have less pronounced blocks and fewer transverse edges and hence exhibit a poor traction capability in snow. Furthermore, tires having circumferential grooves are also known where over the circumference the circumferential grooves are divided into sections that extend entirely in the axial direction, in other words not only the side walls but also the base of the groove extend in the axial direction. Although this makes it possible to have more transverse edges, however the linear orientation of the groove is interrupted and hence a particularly rapid withdrawal of water is prevented.

It is therefore an object of the present invention to provide a tread configuration for vehicle tires with such a tread configuration satisfying not only the requirements of a conventional summer tire, especially with regard to traction under wet conditions, but also enabling an improved traction in snow.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The tread configuration of the present invention is characterized primarily by at least two adjacent circumferentially oriented rows of each two rows being separated from one another by a respective circumferential groove, wherein each of said grooves has a base that extends linearly and parallel to a circumferential direction of the tire and has on both sides of the base a respective side wall that extends radially outwardly from the base and forms side walls of the profiled blocks of an adjacent one of the rows of profiled blocks, wherein, in order to provide a linear discharge of water, radially inner end portions of each of the side walls of the circumferential grooves form respective linear edges with the base that extend parallel to the circumferential direction, whereas radially outer end portions of each of the side walls of the circumferential grooves are essentially oriented in the circumferential direction and form edges with radially outer surfaces of the profiled blocks, the edges having a contour formed by circumferentially extending segments that are periodically interrupted by essentially axially extending segments, and wherein the radially outer edges of at least one of the two side walls of a give one of the circumferential grooves are provided with at least one of the axially extending segments in a circumferentially extending portion of each of the profiled blocks of an adjacent one of the rows of profiled blocks, and each side wall portion, between the radially outer edge thereof and the linear edge of the base, has a continuous, non-stepped surface.

By orienting the base of the circumferential groove in the circumferential direction, it is possible to provide a uniform, desired rapid linear withdrawal of the water as can be achieved with conventional summer tires having a linear groove base oriented in the circumferential direction and linear side walls that are also oriented in the circumferential direction. As a consequence of the inventive axial offsets in the radially outer portion of the circumferential grooves, additional transverse edges are formed in the contact region with a roadway surface to thereby achieve improved traction in snow. Thus, a tire having the inventive tread configuration can be used all year round since it provides good traction not only in wet conditions but also in snow.

From the above, it can be seen that each of the side walls of the grooves intersects the bases of the grooves in order to form respective linear edges with the base. Thus, each side wall has an inner or lower continuous linear edge that extends parallel to the circumferential direction of the tire. In addition, due to the axially extending segments, each side wall has a stepped outer edge that is predominated by circumferentially extending segments such that the radially outer end portions of the side walls are essentially oriented in the circumferential direction.

Pursuant to the present invention, one or both of the side walls of the circumferential groove can have one or more offsets in their radially outer end region in the circumferential portion of each profiled block element of an adjacent row of blocks; if the offsets are disposed on both side walls, the offsets are preferably at least partially phase offset relative to one another in the circumferential direction. Such embodiments enable a particularly uniform and reliable traction in snow.

By providing the phase offset arrangement of the offsets of the side walls that define a circumferential groove, a particularly reliable and uniform traction capability is made possible, and in addition due to the reduction of an accumulation of bending edges along an axial line, the reduction of undesired vibrations is achieved, resulting not only in a reduction of noise but also in a smoother running of the tire.

Pursuant to one specific embodiment of the present invention, at least one circumferential groove, and preferably several circumferential grooves, are provided with circumferentially oriented groove bases, with the adjoining side walls of at least one row of blocks both having axial offsets. This enables a particularly reliable traction over a wide axial region of a tire and also enables improved operation in snow. Again with this embodiment, the offsets are preferably at least partially phase offset relative to one another in the circumferential direction.

The inventive circumferential groove configuration can be realized in a particularly straightforward manner if the side walls of the grooves are disposed at an angle relative to radial lines that extend in section planes through the axis of rotation of the tire. By periodically altering the angle in the circumferential direction it is easy to provide the offsets and hence the desired additional traction edges in the side walls. The aforementioned angle at which the side walls of the grooves extend relative to a radial line is advantageously between 5 and 15°, and preferably between 8 and 120°.

The two side walls of a given groove are advantageously embodied in such a way that they each extend at an angle between 5 and 15°, and preferably 8 and 12°, relative to a radial line. To increase the stiffness and stability of the blocks, and hence to increase the traction, at least one circumferential groove should be disposed axially beyond the equatorial plane of the tire, with that side wall of this groove that is remote from the equatorial plane forming a larger angle with a radial line than does that side wall that is disposed closer to the equatorial plane.

It is particularly expedient for the contour of the edges of the groove side walls to be such that frequent axially extending segments are provided, with these axially extending segments being disposed at irregular intervals that alternately extend axially away from and then toward an equatorial plane of the tire to thereby maintain the essentially circumferential orientation of such contour.

Pursuant to a specific embodiment of the present invention, the base of each circumferential groove is rounded, with this roundness extending from one side wall to the other, and in particular extending between where the respective side walls intersect such base to form a linear lower edge of the side wall with such a base.

Pursuant to a further specific exemplary embodiment of the present invention, it is possible to provide a side wall with a slight curvature, whereby the center point of the radius of curvature is disposed in the region of the profiled block element or radially inwardly thereof; this stabilizes the adjacent block.

By means of a balanced relationship of the diagonals of the profiled block elements of a row of blocks, the blocks can be particularly stiff and hence have a particularly favorable traction capability. In a particularly advantageous configuration of a central row of blocks, a high diagonal ratio of between 0.25 and 0.8, preferably essentially 0.4, is provided, with the longer diagonal forming an angle of less than 45° relative to the circumferential direction. This enables a particularly great circumferential stiffness in the central region, and helps to reduce noise. Such a central row of blocks is adjoined by at least one row of blocks on each side, with the profiled block elements of such additional rows each having an essentially balanced diagonal relationship of between 0.9 and 1; in other words, a diagonal ratio of essentially 1:1. The profiled block elements, at least of the central row of blocks, are preferably embodied in such a way that when viewed in the axial direction of the tire, a right and left portion are provided that are separated from one another by a circumferential line that extends centrally through the row of blocks. Furthermore, the profiled block elements are phase offset relative to one another in the circumferential direction along this circumferential line.

Further specific features of the present invention will be described in detail subsequently.

DESCRIPTION OF THE PREFERRED EMBODIMENTS

Figure 1:
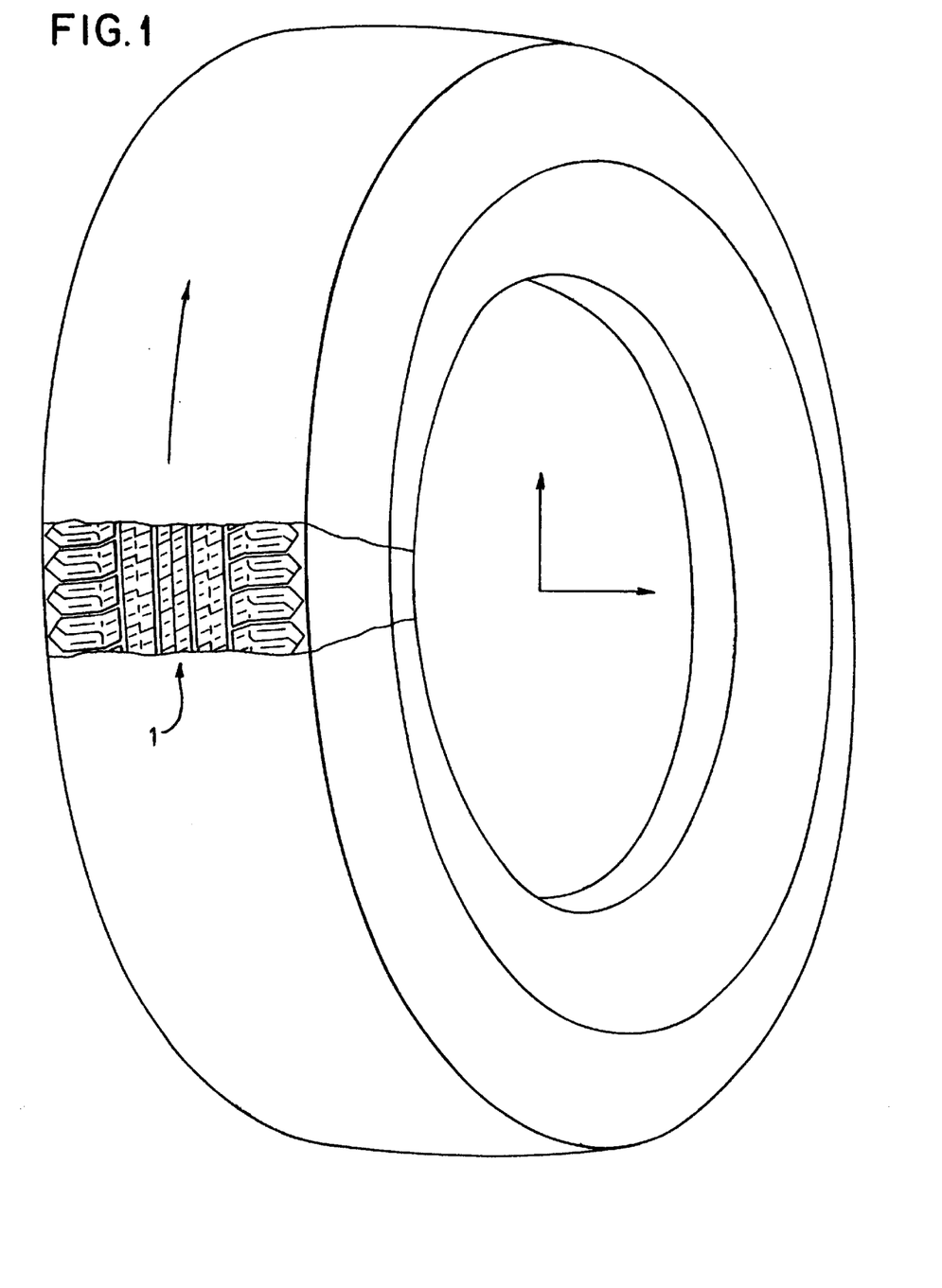
FIG. 1 is an isometric view showing a portion of one exemplary embodiment of the inventive tire tread configuration.

Referring now to the drawings in detail, FIG. 1 illustrates one exemplary embodiment of a pneumatic vehicle tire having a tread 1. In a manner known per se, the tire has an axis that in FIG. 1 is schematically indicated by the arrow that is pointing to the right. The radial lines or directions extend radially outwardly from this axis, with one such radial line being shown by the upwardly pointing arrow. The circumferential direction is schematically indicated by the arrow shown on the tread.

Figure 2A:
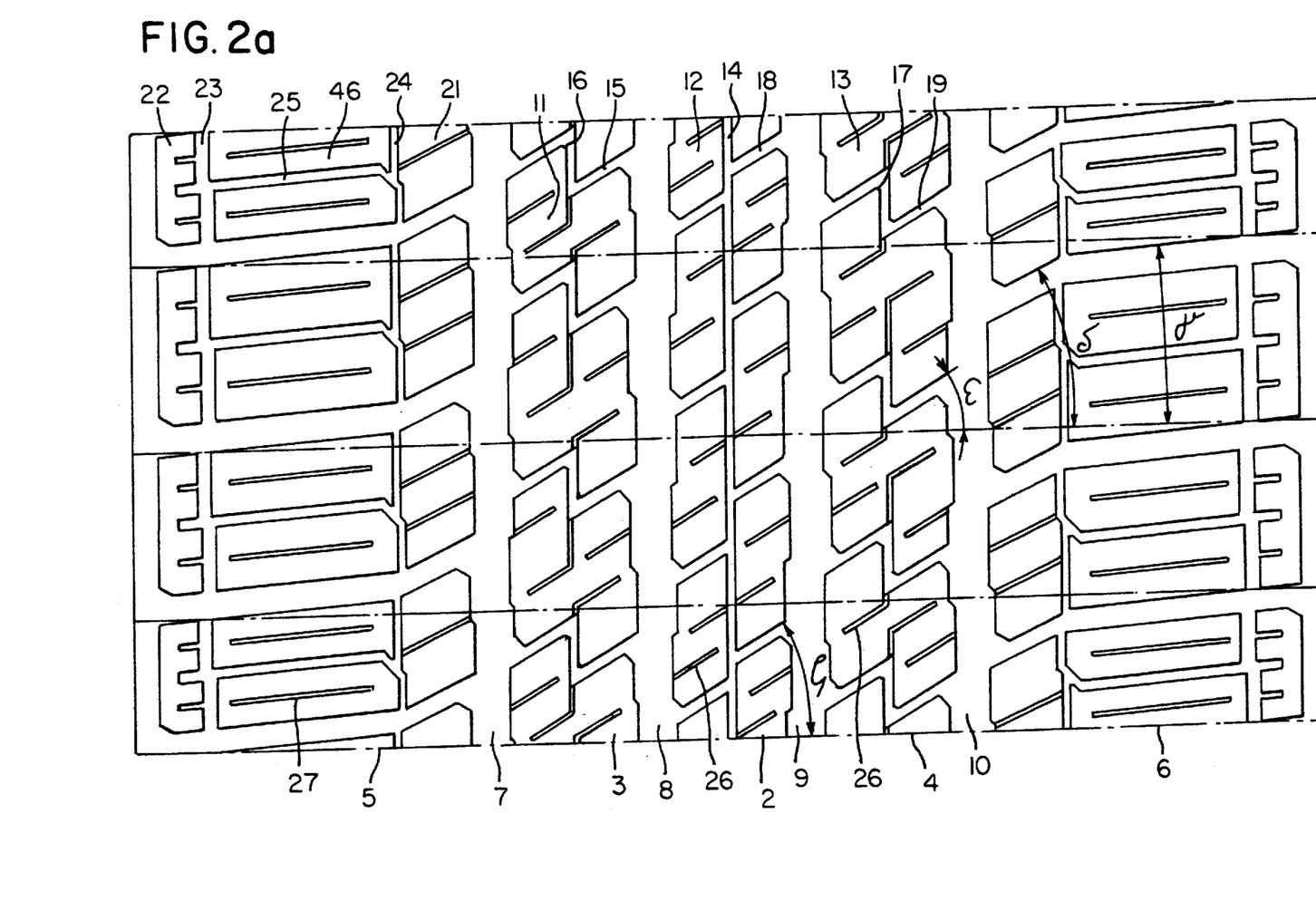
FIGS. 2a–2c are plan views of specific embodiments of inventive tread configurations, with the bases of the grooves having been omitted for ease of illustration.
Figure 2B:
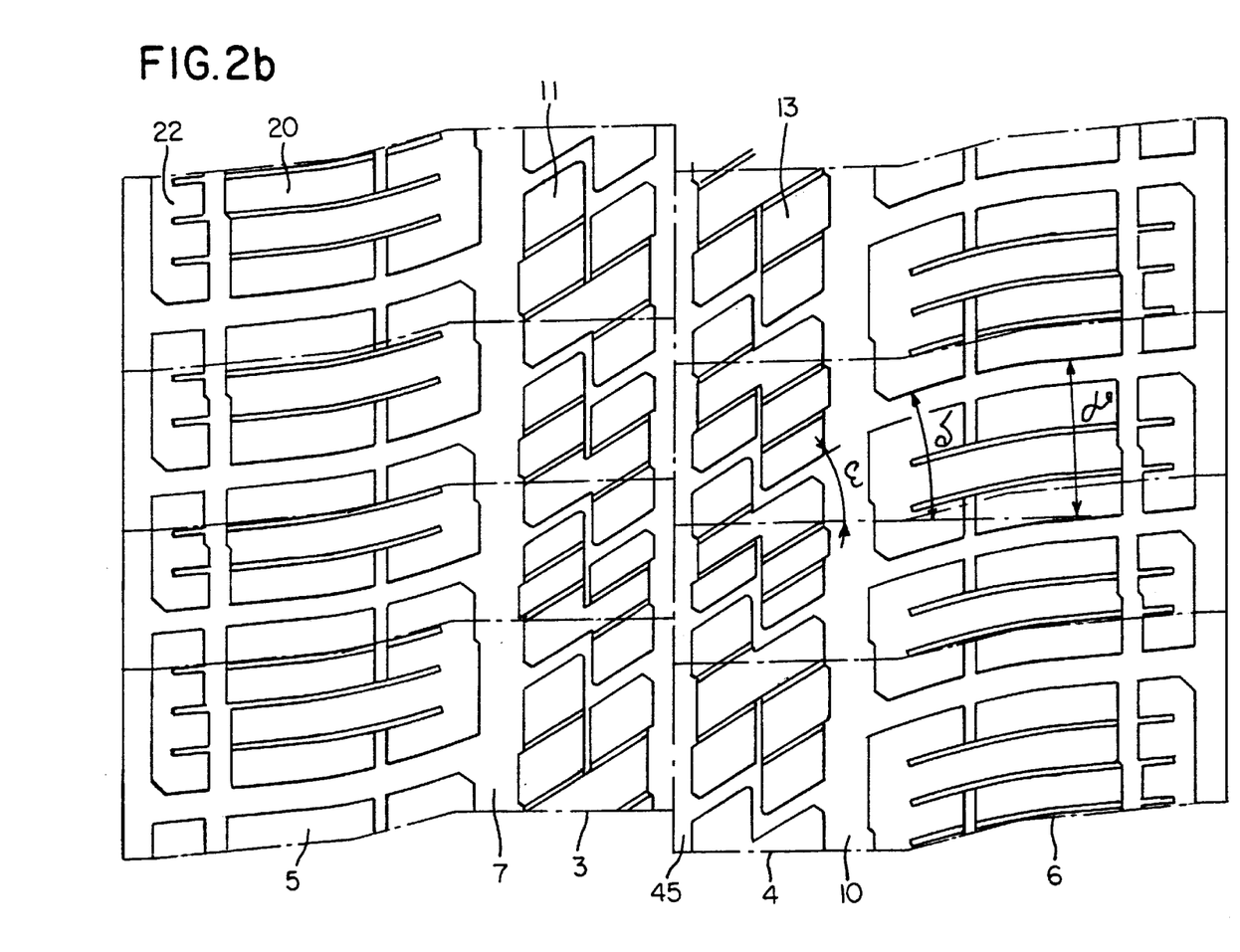
Figure 2C:
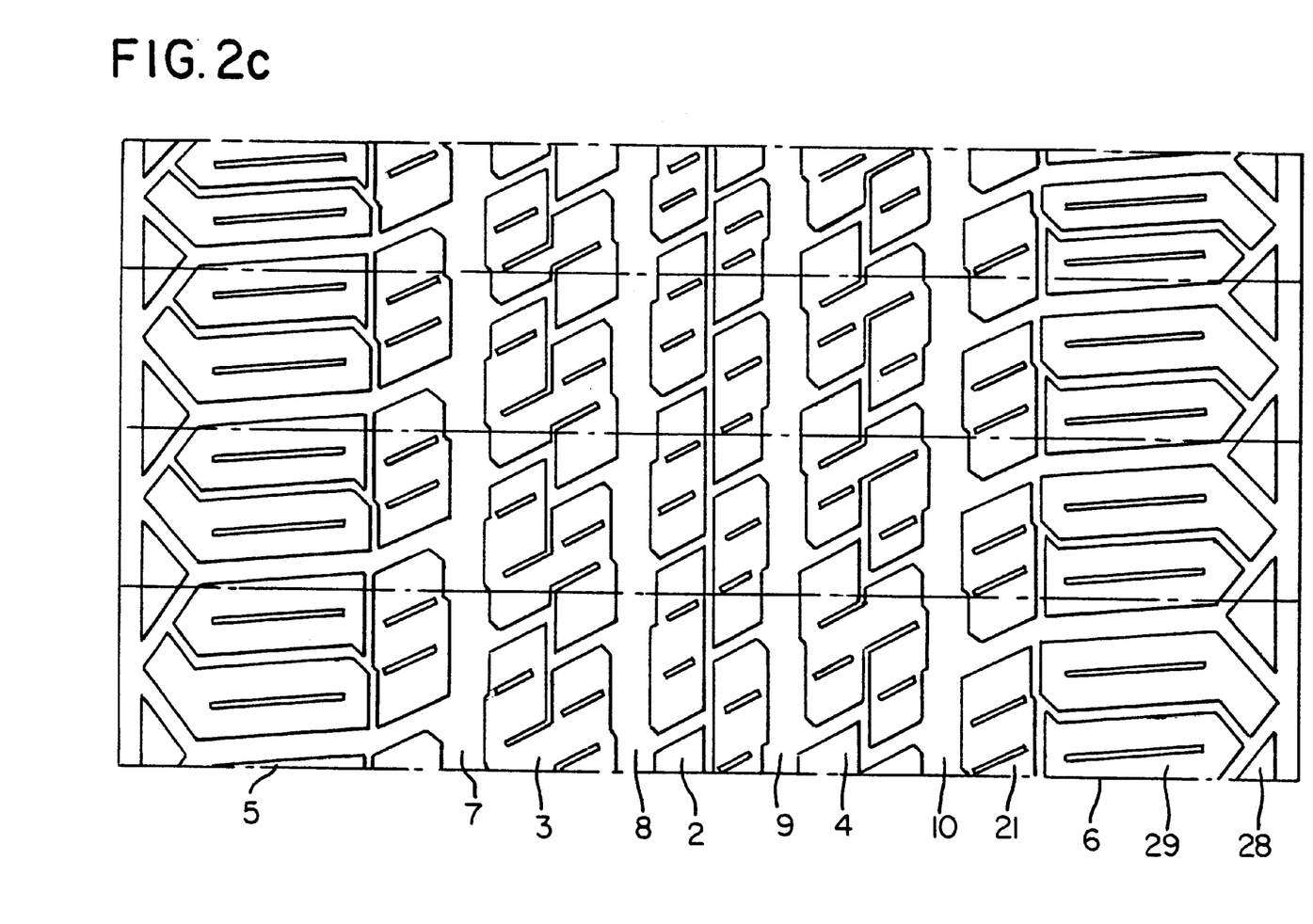

FIGS. 2a to 2c show in plan specific inventive embodiments of tread configurations. These configurations are provided with rows 3 and 4 of profiled or shaped blocks. In addition, the embodiments of FIGS. 2a and 2c are each provided with an additional central row of profiled blocks 2, with this row being disposed between the two other rows 3 and 4. In a known manner, the tread configuration is bounded on each axially outer side by a row 5 or 6 of shoulder blocks. Circumferentially extending, or simply circumferential, grooves 7, 45, 10 (FIG. 2b) or 7, 8, 9, 10 (FIGS. 2a and 2c) are respectively provided between the rows 2, 3 and 4 of profiled blocks as well as between the rows 3, 4 on the one hand and the adjacent row of shoulder blocks 5, 6 on the other hand. These circumferential grooves respectively separate two adjacent rows of shoulder blocks, or a row of profiled blocks and the adjacent row of shoulder blocks, from one another.

Each row of profiled blocks comprises profiled block elements that are successively arranged in the circumferential direction of the tire. For example, the row 3 of profiled blocks comprises profiled block elements 11, the row 4 comprises block elements 13, and the row 2 comprises profiled block elements 12. The profiled block elements 12, when viewed in the axial direction of the tire, can have a left portion and a right portion that are centrally separated from one another by the circumferential line or groove 14; the right and left portions of the profiled block elements 12 can be phase offset relative to one another. Furthermore, adjacent profiled block elements within a row of such elements are respectively separated from one another by narrow transverse grooves 15, 18 and 19. In a similar manner, the rows of shoulder blocks comprise adjacent shoulder blocks that are separated from one another by transverse grooves. For example, as illustrated in FIG. 2a, these shoulder blocks can comprise a number of shoulder elements 21, 46 and 22 that are disposed next to one another when viewed in the axial direction and are separated from one another by narrow circumferential grooves 23 and 24. Disposed between the elements 21 and 22 are two similar shoulder block elements 46, which can be separated from one another by narrow transverse grooves 25. It would also be conceivable, as illustrated, for example, in FIG. 2b, to dispose only two shoulder block elements next to one another in the axial direction. Furthermore, as shown in FIG. 2c, it would also be possible for the outer shoulder block elements 28 to have, for example, a triangular configuration, whereupon the central shoulder block elements 29 would be disposed between two triangular shoulder block elements 28. The shoulder block elements, as well as the other profiled block elements, can also be provided with slits or sipes 27 or 26, as shown, for example, in FIG. 2a.

Figure 3:
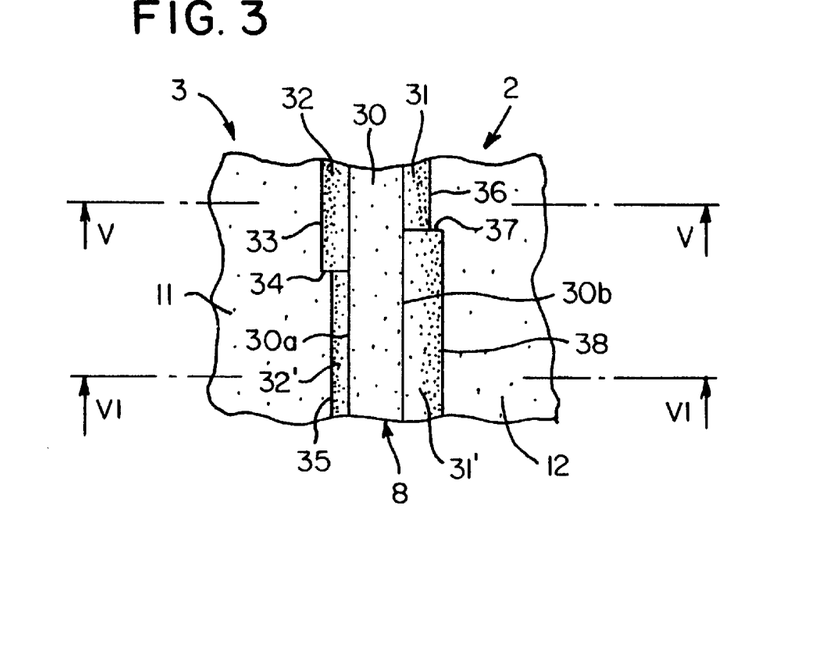
FIG. 3 is an enlarged plan view of a portion of a groove.
Figure 5:
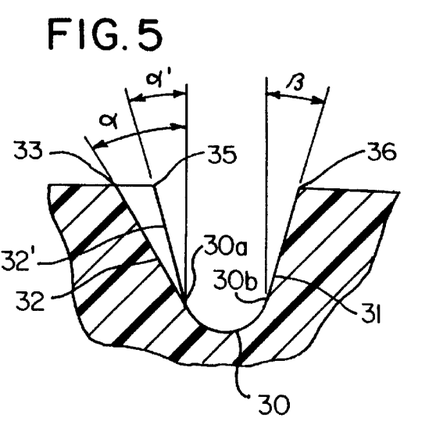
FIG. 5 is a cross-sectional view taken along the line V—V in FIG. 3.
Figure 6:
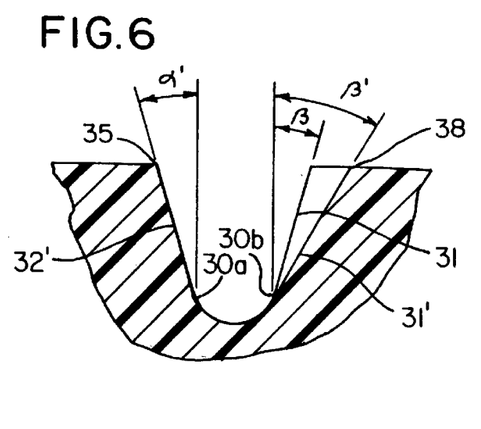
FIG. 6 is a cross-sectional view taken along the line VI—VI in FIG. 3.

As shown by way of example with respect to the circumferential groove 8 in FIGS. 3, 5 and 6, the circumferential grooves 7, 8, 9 and 10 have a rounded groove base 30 that extends linearly in the circumferential direction. A side wall 32, 32' which delimits the profiled element 11, extends radially outwardly from the side of the groove base 30 at an angle, α, α' respectively (FIG. 5) relative to a radial line. A side wall 31, 31' which delimits the profiled element 12, extends radially outwardly from the other side of the groove base 30 at an angle β, β' respectively (FIG. 6) relative to a radial line. As shown in FIGS. 3 and 5, the side wall 32, 32' forms an intersection edge 33, 35' in the region of the support surface of the profiled block 11 where the side wall 32, 32' intersects with the radially outwardly directed surface of the profiled block 11. The intersection edge 33 (See FIG. 3) extends in the circumferential direction until it forms an axial offset 34, where the edge is axially displaced along the offset portion 34 and the angle α that the side wall 32 forms with a radial line changes. Subsequent to the offset 34, the side wall 32' assumes an angle α' (FIGS. 5 and 6) relative to a radial line, and the intersection edge again extends in the circumferential direction in the region 35. As can be seen in FIGS. 2a to 2c, where merely the intersection edges of the profiled element surfaces with the side walls of the circumferential grooves are illustrated, and in which for ease of illustration the bases of the grooves are not shown, frequent, irregularly repeated (i.e. the intervals between the offsets 34 are not uniform, as can be seen in FIGS. 2a–2c) axial offsets are provided in an axially inwardly and then axially outwardly, i.e. alternating, fashion to thereby provide a repeated increase or decrease of the angle α in the range between 5 and 15°, and preferably between 8 and 12°. In particular, the offsets or axially extending segments 34 alternately extend axially away from and then toward an equatorial plane of the tire, thereby mainting an essentially circumferential orientation of the contours of the edges of the circumferential grooves. In this connection, it is conceivable to vary the offset locations 34 on the individual profiled blocks with respect to the position on the block. It is also conceivable to provide a plurality of offset edges in the region of a single profiled block. At any rate, it can be seen that the circumferentially extending segments of the radially outer edges of the side walls of the circumferential grooves predominate the contour of such edges to ensure that the contour is essentially oriented in the circumferential direction of the tire.

As can be seen in FIGS. 3, 5 and 6, the other side wall 31, 31' also extends at an angle β, β' relative to a radial line radially and axially outwardly from the base 30 of the groove 8. In the region of the outer surface of the profiled block 12, the side wall 31, 31' forms an intersection edge, such as the edge 36 in FIG. 5 and the edge 38 in FIG. 6, with the radially outer surface of the profiled block 12. The side wall 31 maintains the angle β and a circumferential extension of the intersection edge 36 until the offset edge 37 is reached, where the intersection edge is displaced to the side in an axial direction and the angle β is altered. Subsequent to the offset 37, the side wall 31' assumes an angle β' with a radial line and forms with the surface of the profiled block 12 a circumferentially extending intersection edge 38 that continues until the next, nonillustrated, offset edge is encountered.

As indicated above, the side walls of each of the circumferential grooves 7, 8, 9 and 10 are provided with offset edges i.e. the axially extending segments 34, 37, at irregular or non-uniform intervals where the side walls of these grooves change their angle relative to a radial line.

As illustrated in FIGS. 2a to 2c, it is possible to provide the offset edges of one of each pair of side walls in very irregular intervals, and to dispose the offset edges of the individual side walls relative to one another as well as of the individual grooves relative to one another to the greatest extent possible not in the same axial position.

Figure 7:
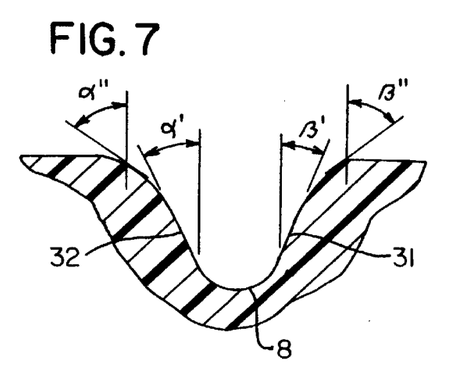
FIG. 7 is a cross-sectional view of an alternative groove configuration with curved side walls.

The bases 30 of the various circumferential grooves expediently have a round cross-sectional configuration, as very clearly shown in FIGS. 5–7. As can be seen in conjunction with FIG. 3, the intersection of the side walls 31, 31' or 32, 32' with the bases 30 of the circumferential grooves forms respective linear edges 30a, 30b between the radially inner end portions of each of the side walls and the rounded base 30. In other words, the extensions of the planes of the side walls, in other words either 32, 32' or 31, 31', coincide with one another to form the aforementioned linear lower edges 30a, 30b. As can furthermore be seen from the drawings, these linear edges extend parallel to the the circumferential direction of the tire. Furthermore, due to linear, nature of the base of the side walls and the stepped contour of the upper edges as caused by the axially extending sections, side wall sections will inherently be formed such that the planes of these side wall sections have different angles, as can be seen from FIGS. 5 and 6.

Due to the linear extension of the base 30 of the groove 8, water that is encountered can rapidly escape along direct or linear paths. Furthermore, the offset edges or axially extending segments 34, 37 form additional gripping edges to improve traction in snow.

Figure 4:
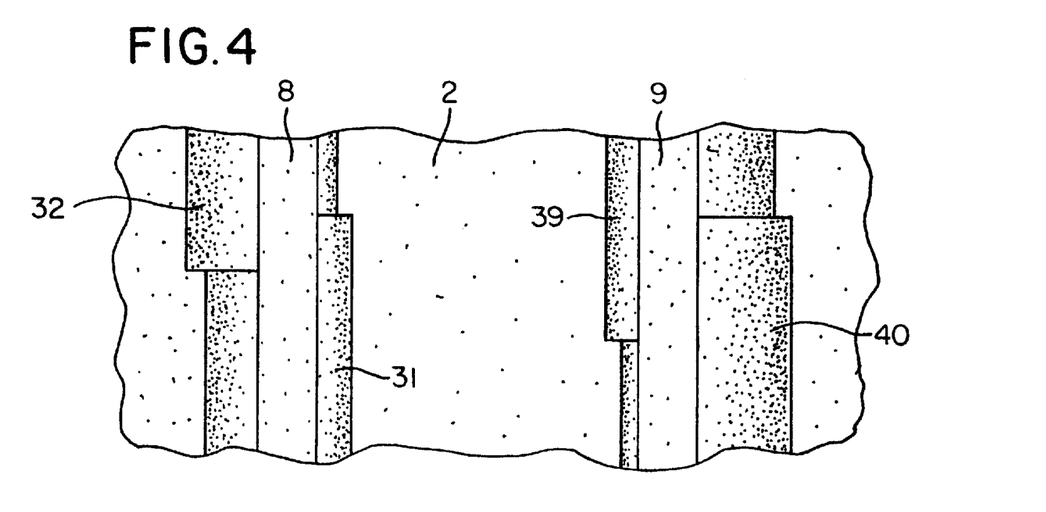
FIG. 4 is an enlarged plan view showing portions of two grooves that are disposed beyond the central plane of the tire.

It is also conceivable, as illustrated in FIG. 4, to provide those side walls 31 and 39 that are axially directed toward the central equatorial plane of the tire with a smaller angle β relative to a radial line between 8 and 120° at each circumferential direction than the angle α of those side walls 32, 40 that are directed axially away from the central equatorial plane; this results in additional stability.

As schematically shown by way of example in FIG. 7, it is also conceivable to increase the angle α or β of the side walls 32, 31 at increasing radial distances, so that the side walls experience a certain curvature with a radius of curvature in the region of the associated profiled element or below the profiled element; here also axial offsets, and hence angle changes, are provided in the circumferential direction. As a result of this curvature of the side wall, an additional stability of the profiled blocks can be achieved.

In either case, in other words, where the surface of the side walls 32, 32' or 31, 31' is either planar or curved, a continuous, non-stepped surface will be provided between the radially outer edge of the side wall and the linear, radially inner edge where the side wall meets the rounded base 30; this is clearly shown not only in FIGS. 3 and 4, but also in FIGS. 5–7.

Figure 8A:
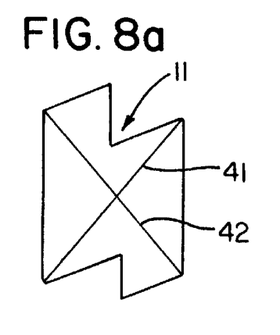
FIGS. 8a and 8b are plan views of block elements to illustrate the relationship of the diagonals.
Figure 8B:
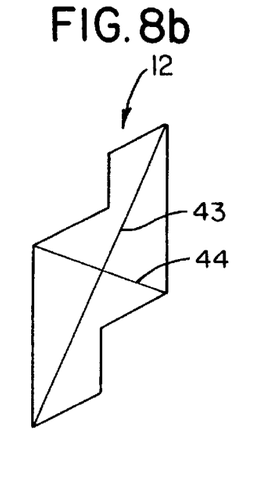

As indicated previously, when viewed in an axial direction the profiled block elements 11, 12 and 13 can each have right and left halves which are displaced relative to one another in a circumferential direction relative to a circumferential line, as can be seen in FIGS. 2a–2c. In this connection, the circumferential line in the central profiled block row 2 can be formed by a narrow circumferential groove 14. As shown in FIGS. 8a and 8b, the profiled block elements have diagonals in the directions of the main structure. The diagonals of the profiled blocks 11 and 13 are the diagonals 41 and 42, while the diagonals of the profiled blocks 12 are the diagonals 43 and 44. In this connection, to increase the stability it is conceivable to provide the diagonals 41 and 42 with essentially the same lengths so that they have a length ratio between 0.8 and 1, preferably 0.9 and 1, while the diagonals 43 and 44 could have a length ratio of between 0.25 and 0.8, and preferably 0.4. The longer diagonal 43 should assume an angle of between 5 and 40°, and prefer 20 to 30°, with the circumferential direction.

The present invention is, of course, in no way restricted to the specific disclosure of the specification and drawings, but also encompasses any modifications within the scope of the appended claims.

What we claim is:

1. A vehicle tire having a tread configuration comprising: at least two adjacent circumferentially oriented rows of profiled blocks, each of the at least two adjacent rows being separated from one another by a respective circumferential groove, wherein each groove has a base that extends linearly and parallel to a circumferential direction of said tire and has on both sides of said base a respective side wall that extends radially outwardly from said base and forms side walls of said profiled blocks of an adjacent one of said rows of profiled blocks, wherein radially inner end portions of each of said side walls of said circumferential groove form respective linear edges with said base that extend parallel to said circumferential direction, whereas radially outer end portions of each of said side walls of said circumferential groove are essentially oriented in said circumferential direction and form radially outer edges with radially outer surfaces of said profiled blocks, said radially outer edges having a contour formed by circumferentially extending segments that are periodically interrupted by essentially axially extending segments, wherein said radially outer edges of at least one of said two side walls of said circumferential groove are provided with at least one of said axially extending segments in a circumferentially extending portion of each of said profiled blocks of an adjacent one of said rows of profiled blocks to thereby form successive circumferentially extending segments and associated side wall portions in that profiled block, wherein said side wall portions have an alternating greater and then lesser angle relative to a given radial plane, and wherein each side wall portion of a given block, between said radially outer edge thereof and said linear edge at said base, has a non-stepped surface that adjoins said base in a linear edge that is a single straight line for all radially inner end portions of said side wall portions of that block.

2. A vehicle tire according to claim 1, wherein said radially outer edges of each of said two side walls of said circumferential groove are provided with at least one of said axially extending segments in a circumferentially extending portion of each of said profiled blocks of an adjacent one of said rows of profiled blocks, and wherein said axially extending segments of said two side walls of said circumferential groove are at least partially phase offset relative to one another in said circumferential direction.

3. A vehicle tire according to claim 1, wherein at least one of said rows of profiled blocks is bordered on each circumferentially extending side by groove side walls that are provided with said axially extending segments.

4. A vehicle tire according to claim 3, wherein said axially extending segments of said groove side walls of said at least one of said rows of profiled blocks are at least partially phase offset relative to one another in said circumferential direction.

5. A vehicle tire according to claim 1, wherein at least one of said side walls of said circumferential groove diverges axially and radially outwardly from said base of said groove over the entire length of said groove to thereby form an angle of 5–15° with a radial line that extends from an axis of rotation of said tire.

6. A vehicle tire according to claim 5, wherein said angle is between 8 and 12°.

7. A vehicle tire according to claim 5, wherein said angle varies over the circumference of said groove due to the presence of said axially extending segments.

8. A vehicle tire according to claim 5, wherein both of said side walls of said circumferential groove diverge axially and radially outwardly from said base of said groove by said 5–15°.

9. A vehicle tire according to claim 8, wherein said angle is between 8 and 12°.

10. A vehicle tire according to claim 8, which includes at least one circumferential groove disposed axially beyond an equatorial plane of said tire, wherein that side wall of this at least one circumferential groove that is disposed axially further away from said equatorial plane forms an angle with a radial line of said tire that is greater than an angle formed at that cross section of the tire by that side wall of this at least one circumferential groove that is disposed closer to the equatorial plane.

11. A vehicle tire configuration according to claim 5, wherein at least over portions of a circumference of said tire, said angle of said at least one side wall increases as the distance of said side wall from said base of said circumferential groove increases.

12. A vehicle tire according to claim 5, wherein at least one of said rows of profiled blocks comprises blocks having respective surface configurations that include two diagonal axes having a length ratio of between 0.8:1 and 1:1.

13. A vehicle tire according to claim 12, wherein said length ratio is between 0.9:1 and 1:1.

14. A vehicle tire according to claim 12, which includes at least two of said rows of profiled blocks with diagonal axes of essentially the same length, and also includes a central row of profiled blocks disposed between said two of said rows of profiled blocks, wherein said central row comprises blocks having two diagonal axes with a length ratio between 0.25:1 and 0.8:1, with the longer diagonal axis forming an angle of less than 45° with said circumferential direction of said tire.

15. A vehicle tire according to claim 14, wherein said length ratio of said diagonal axes of said blocks of said central row is essentially 04.1:1, and said angle of said longer diagonal axis is 20–30°.

16. A vehicle tire according to claim 14, wherein said blocks of said central row, when viewed in a direction perpendicular to said circumferential direction, are divided into a right portion and a left portion separated by a circumferential line that extends centrally through said central row of blocks, with blocks of said right and left portions of each said block being phase offset in said circumferential direction relative to one another along said circumferential line.

17. A vehicle tire according to claim 1, wherein said contour of said edges of said groove side walls comprise frequent ones of said axially extending segments, which are disposed at irregular intervals.

18. A vehicle tire according to claim 1, wherein said base of said circumferential groove is rounded, said roundness extending from an intersection of one side wall with said base that forms said linear edge therewith, to an intersection of the other side wall with said base that forms said linear edge therewith.

19. A vehicle tire according to claim 1, wherein said circumferentially extending segments of said radially outer edges of said side walls of said circumferential grooves predominate said contour of said edges to ensure that said contour is essentially oriented in said circumferential direction of said tire.

* * * * *